United States Patent [19]

van der Lely et al.

[11] 4,227,580
[45] * Oct. 14, 1980

[54] IMPLEMENT WITH SIDE SCREENING PLATES AND SOIL ROLLER

[75] Inventors: Ary van der Lely, Maasland; Cornelis J. G. Bom, Rozenburgh, both of Netherlands

[73] Assignee: C. van der Lely N. V., Maasland, Netherlands

[*] Notice: The portion of the term of this patent subsequent to Dec. 18, 1996, has been disclaimed.

[21] Appl. No.: 595

[22] Filed: Jan. 2, 1979

Related U.S. Application Data

[60] Continuation of Ser. No. 567,695, Apr. 14, 1975, Pat. No. 4,178,997, which is a continuation of Ser. No. 393,026, Aug. 30, 1973, abandoned, which is a division of Ser. No. 172,511, Aug. 17, 1971, Pat. No. 3,774,689.

[30] Foreign Application Priority Data

Aug. 18, 1970 [NL] Netherlands ............ 7012157

[51] Int. Cl.³ ........................... A01B 33/12
[52] U.S. Cl. ................. 172/112; 172/68; 172/71; 172/509
[58] Field of Search .......... 172/59, 63, 68, 112, 172/71, 111

[56] References Cited

U.S. PATENT DOCUMENTS 4,178,997  12/1979  van der Lely et al. ............ 172/112

FOREIGN PATENT DOCUMENTS 6807548  12/1969  Netherlands ........................ 172/59

*Primary Examiner*—Edgar S. Burr
*Assistant Examiner*—Steven A. Bratlie
*Attorney, Agent, or Firm*—Mason, Mason and Albright

[57] ABSTRACT

A harrow has an elongated frame beam supporting a row of rotatable soil-working members mounted side-by-side on upwardly extending shafts. The frame beam and row of soil-working members extend transverse to the direction of travel of the harrow. At each lateral end of the row, a screening plate is positioned and pivoted to the frame beam. Each screening plate extends in a substantially vertical plane in the general direction of travel. Also, each plate has a lower support portion that rides over the ground and side edges that are inclined upwardly. The screening plates are supported on arms that can be pivoted to relocate the plates 180 degrees so they can rest in inverted positions on top of the frame beam during transport. A roller is pivoted to the frame and positioned to the rear of the soil working members and the screening plates are located between the roller and the members, when seen from the side.

5 Claims, 2 Drawing Figures

U.S. Patent   Oct. 14, 1980   4,227,580
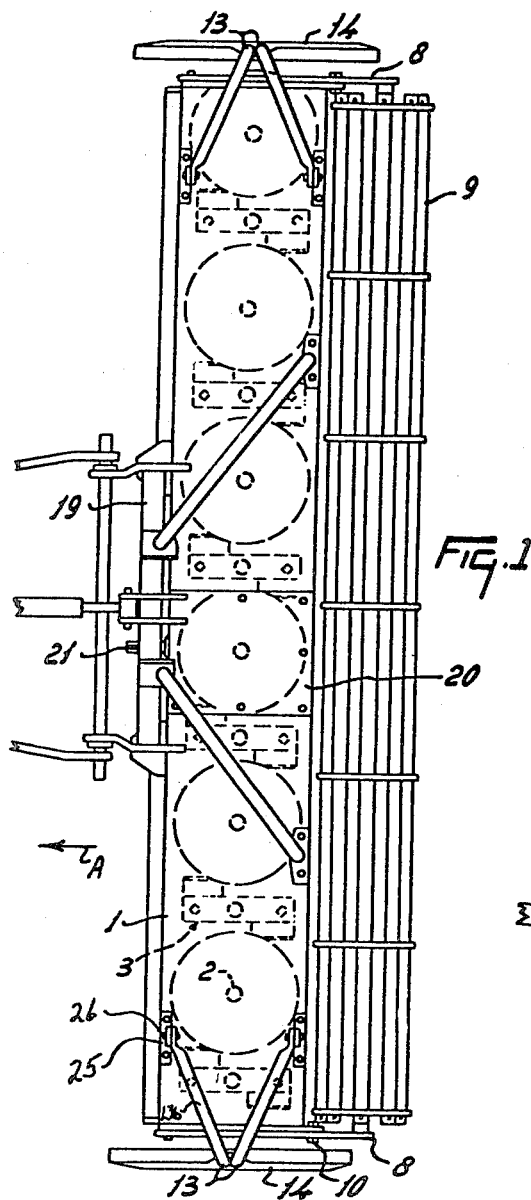
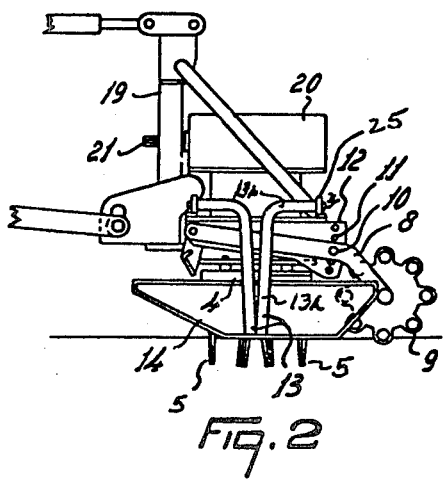

IMPLEMENT WITH SIDE SCREENING PLATES AND SOIL ROLLER

This application is a continuation of Ser. No. 567,695 filed Apr. 14, 1975 now U.S. Pat. No. 4,178,997 which is a continuation of Ser. No. 393,026 abandoned, filed Aug. 30, 1973, which is a division application of Ser. No. 172,511 filed Aug. 17, 1971 U.S. Pat. No. 3,774,689.

According to the invention, there is provided a rotary harrow of the kind set forth, wherein substantially vertical screening plates are movably arranged adjacent the opposite lateral ends of the row of working members, said plates being provided at their lower edges with support portions which ride over the ground during operation of the harrow, the support portions joining rearmost edges of the plates with respect to the intended direction of operative travel of the harrow and said rearmost edges being inclined upwardly and rearwardly relative to that direction.

For a better understanding of the invention, and to show how the same may be carried into effect, reference will now be made, by way of example, to the accompanying drawings, in which:

FIG. 1 is a plan view illustrating a rotary harrow in accordance with the invention, and FIG. 2 is a side elevation corresponding to FIG. 1.

Referring to the drawings, the rotary harrow that is illustrated has a frame which is afforded principally by a light but strong hollow box-shaped beam 1 that extends substantially horizontally perpendicular to the intended direction of operative travel of the harrow which is indicated by an arrow A in FIG. 1 of the drawings. The beam 1 has a plurality (preferably twelve) of soil working members 3 rotatably mounted beneath it in a single row with the individual members in adjacent relationship with their neighbours. Each soil working member 3 is rotatable about the axis of a corresponding upright shaft 2 and each shaft 2 is rotatable in a corresponding substantially vertical bearing that is fastened to the bottom of the hollow frame beam 1. The lowermost end of each shaft 2 carries a corresponding elongated tine support 4 carrying two tines 5 at its opposite ends.

The shafts 2 are preferably spaced apart from their neighbours by perpendicular distances of substantially 25 centimeters and, since the perpendicular distance between the tips of the two tines 5 of each soil working member 3 is of greater magnitude, the strips of ground worked by the individual members 3 overlap one another to produce, in effect, a single broad strip of worked ground during a traverse of the harrow. Each end of the hollow frame beam 1 is provided with a corresponding arm 8, the two arms 8 extending rearwardly with respect to the direction A and being turnable about substantially horizontally aligned pivots at their leading ends. A soil compressing member in the form of a roller 9 is rotatably mounted between the rearmost ends of the two arms 8 which arms can be retained in chosen angular settings about their pivotal connections with end plates 12 of the beam 1 by entering locking pins or bolts 10 in appropriately chosen holes 11 of arcuate rows of such holes that are formed in generally sector-shaped rear portions of the end plates 12. It will be apparent that the holes 11 that are chosen to co-operate with the locking pins or bolts 10 effectively determine the working depths of the tines 5. It can be seen from FIGS. 1 and 2 of the drawings that the roller 9 is not a smooth-surfaced roller. The roller has a central rotary shaft around which eight tubular ground-engaging members are movably arranged in regularly spaced-apart relationship with the aid of seven supports rigidly secured to the central shaft of the roller.

The screening plates 14 are arranged adjacent the opposite lateral sides of the row of soil working members so as to be contained in planes that, during operation of the harrow, are normally substantially vertical and that extend substantially parallel to the direction A. Each plate 14 is provided at its lower edge with a support portion which rides slidably over the ground during operation of the harrow. The support portion extends through a length which is substantially half the length of the upper edge of the corresponding plate 14 and integrally joins leading and rearmost edges of the plate with respect to the intended direction of travel of the harrow. The leading edge is inclined upwardly and forwardly whereas the rearmost edge is inclined upwardly and rearwardly.

The upper edge of each screening plate 14 comprises a part which joins the part forming that edge. The plates 14 are turnable in brackets 25 on the top of frame beam 1 about substantially horizontal and aligned pivots 26 that define a substantially horizontal axis and extend parallel to the direction A on top of the beam 1, pairs of rigid profiled arms 13 being employed to couple the plates 14 to the corresponding pivots. The arms are connected to the plates by means of substantially vertically extending parts which are located adjacent each other. When the harrow is being transported without performing any working operation, the plates 14 and arms 13 are preferably, but not essentially, turned upwardly through approximately 180° about their pivots 26 so that the plates 14 can lie in inverted positions on the beam .

The arms 13 of each screening plate 14 each have a substantially vertical portion 13a and a substantially horizontal portion 13B that extends beyond the lateral side of frame beam 1. The portions 13a and 13b join one another directly above plate 14 as seen in FIG. 1 and immediately above beam 1, as seen in FIG. 2. The portions 13b diverge from one another to their pivot connections with brackets 25 which are positioned a substantial distance from the lateral side of beam 1 so that when the plates 14 are placed in inverted positions to rest on top of beam 1, the arms 13 and plates 14 do not extend to the lateral sides of frame beam 1. As seen in FIG. 1, the pivots 26 are spaced from the lateral sides of beam 1 by a distance that approximates the distance between the shafts 2 of adjacent soil-working members.

A trestle-shaped coupling member 19 constructed to co-operate with the lifting links of the three-point lifting device or hitch of an agricultural tractor or other vehicle is provided substantially centrally at the front of the harrow and has its upper region connected by two inclined strengthening beams to regions at the top and rear of the beam 1 that are spaced from the center of that beam. A gear box 20 is mounted on top of the beam 1 immediately to one side of the center thereof and has a forwardly projecting splined or otherwise keyed rotary input shaft 21 that can be placed in driven connection with the power take-off shaft of the tractor or other vehicle, to which the coupling member 19 is connected, by way of a conventional telescopic transmission shaft having universal joints at its opposite ends. The rotary shafts 2 of the soil working members 3 are rotated in directions that are relatively opposite to their neighbours by a train of intermeshing pinions that are contained inside the hollow beam 1 and that are powered from the input shaft 21 by way of bevel pinions contained within the gear box 20.

In the use of the harrow which has been described, it is moved over the ground which is to be worked in the direction A with each soil working member 3 rotating in a direction opposite to its neighbour or neighbours. The screening plates 14 at opposite ends of the row of soil working members 3 are arranged in the operative positions shown in FIGS. 1 and 2 of the drawings with the arms 13 turnable freely about their pivots so that said plates 14 can move upwardly and downwardly as may be required to match undulations in the surface of the soil over which the harrow is travelling. The roller 9 acts to break up any remaining surface lumps in the soil and effects a degree of compression of the worked soil sufficent to avoid excessive and rapid drying of that soil. It will be remembered that it is the vertical setting of the axis of rotation of the roller 9 relative to the level of the remainder of the harrow that principally governs the effective working depths of the tines 5.

What is claimed is:

1. A harrow comprising an elongated frame extending transverse to the normal direction of travel and a plurality of adjacent soil-working members supported in a row on said frame, drive means being provided for rotating said soil-working members about upwardly extending axis and each of said members comprising a substantially horizontal support with at least one downwardly extending tine, a substantially vertical screening plate being normally positioned adjacent each opposite lateral side of said row, said plate extending in the general direction of travel and having a lower edge, said lower edge being positioned to ride over the ground during travel, said plate being pivoted to said frame through arm means and said arm means extending from said plate upwardly and then substantially horizontally, in the longitudinal direction of said frame, said arm means being pivoted to the frame a substantial distance from the lateral side thereof and said distance corresponding substantially to the distance between the axes of rotation of two adjacent soil-working members, said plate being freely turnable upwardly and downwardly to match ground undulations during travel, a soil compressing roller being connected to the frame by pivotable supports, said roller being positioned to the rear and spaced from said row and said plate being positioned between the roller and said soil working members, when viewed from the side, to screen the space between the roller and said members.

2. A harrow as claimed in claim 1, wherein separate arms of said arm means are connected to said screening plate and said arms having portions that normally extend substantially vertically and are positioned adjacent each other, said arms having further portions that extend substantially horizontally over and above the top of the frame to pivot connections.

3. A harrow as claimed in claim 1, wherein said lower edge has a support portion that extends through a length which is substantially half the length of said upper edge of said screening plate, said plate having a rearmost edge that is inclined upwardly and rearwardly from said lower edge and a leading edge that extends upwardly and forwardly from the lower edge.

4. A harrow comprising an elongated frame extending transverse to the normal direction of travel, a plurality of soil-working members supported in a row on said frame, said soil-working members being rotatably mounted on upwardly extending shafts and each of said members comprising a support with at least one downwardly extending tine, a substantially vertical screening plate being normally positioned adjacent each opposite lateral side of said row and said plate extending in the general direction of travel, said plate having a lower edge that rides over the ground during travel, said plate being pivotably connected to said frame through arm means and said arm means extending from said plate and connected to said frame a substantial distance from the lateral side of said frame, said plate being pivotably connected to said frame and freely turnable upwardly or downwardly about an axis which extends generally parallel to the direction of travel of the harrow to match ground undulations, a soil compressing roller being connected to the frame by pivotable supports, said roller being positioned to the rear and spaced from said row and said plate being positioned between the roller and said soil working members, when viewed from the side, to screen the space between the roller and said members.

5. A harrow comprising an elongated frame extending transverse to the harrow's normal direction of travel, a plurality of soil-working members supported in a row along said frame, each soil-working member being rotatably mounted on a shaft having a substantially vertical axis and comprising a support having at least two downwardly extending tines and each of said two tines being spaced substantially the same radius from said shaft, substantially vertically disposed screening plates normally positioned adjacent the opposite lateral sides of said row and each plate extending in the general direction of harrow travel, a soil compressing roller connected to said frame and located behind said soil working members, said screening plate being positioned laterally outwardly and immediately adjacent an outer soil working member, said screening plate having a lower edge adapted to ride on the ground during travel, arm means pivotally connecting said screening plate to said frame, said arm means extending inboard from the screening plate and being pivoted to the top of said frame a substantial distance from the lateral side of said row, inboard of the shaft for said outer soil working member, said plate being freely turnable about an axis which extends generally parallel to the normal direction of travel, whereby said plate independently rides along the ground at levels both above and below the surface of the supporting roller during travel.

* * * * *